June 4, 1940.  J. A. SPERRY  2,203,369
MITER BOX
Filed Aug. 27, 1938
Fig.1.
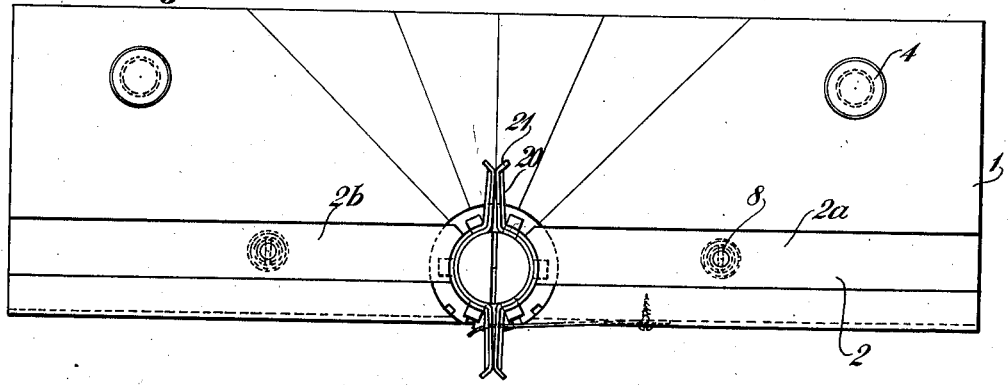
Fig.2.
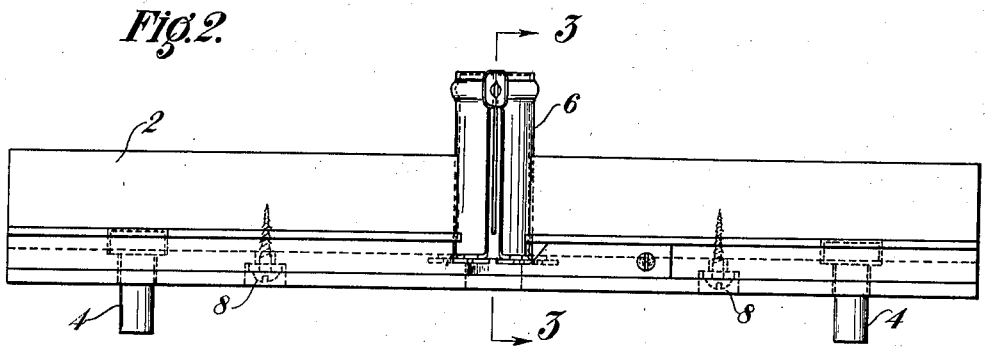
Fig.3.
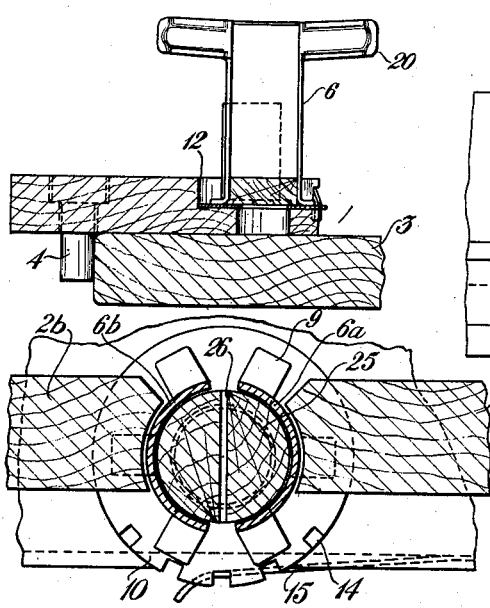
Fig.4.
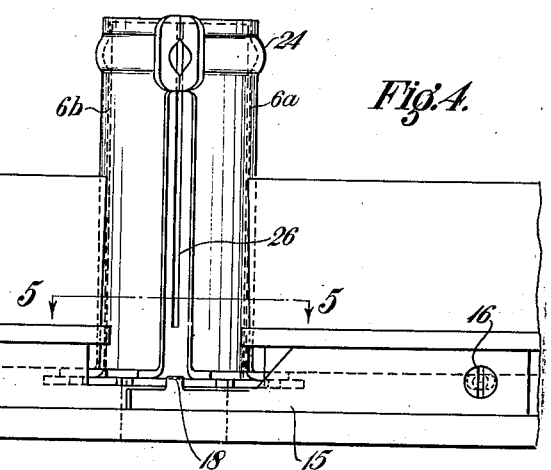
Fig.5.
INVENTOR
John A. Sperry
BY
Ely & Frye
ATTORNEYS – Patented June 4, 1940

2,203,369

UNITED STATES PATENT OFFICE 2,203,369

MITER BOX

John A. Sperry, Tallmadge, Ohio, assignor to The Baker-McMillen Company, Akron, Ohio, a corporation of Ohio Application August 27, 1938, Serial No. 227,161

4 Claims. (Cl. 143—89)

The present invention has for its object the improvement of miter boxes such as used by carpenters and is designed and intended to secure very accurate adjustments and positive guiding of the saw blade so that exact cuts are secured. It is also an object of the invention to improve upon previous devices of this character as will be understood from the detailed description set forth herein. It will be understood that the drawing and description are for the best known embodiment of the invention and that changes and modifications may be made therein within the scope of the claims.

In the drawing in which the preferred form of the invention is illustrated:

Figure 1 is a plan view of the improved miter box;

Figure 2 is a side elevation;

Figure 3 is a cross-section on the line 3—3 of Fig. 2;

Figure 4 is an enlarged detail view taken at the saw-guide; and

Figure 5 is a section on the line 5—5 of Fig. 4.

The miter box consists of the base 1 and the rail 2 at the side thereof, the base being provided with the two removable headed dowel pins 4 which are so located that when the box is placed upon a bench or table the pins will locate the box and afford abutments against the edge of the bench 3, as is shown in Fig. 3. These pins may be removed if it is desired to locate the box in some other position with respect to the bench.

The rail, which has been designated by the numeral 2, is made in two parts 2a and 2b set in a groove across the base extending on either side of the saw guide 6. Each section of the rail is adjustable toward and from the saw guide by means of screws 8 countersunk in the base and received in each rail section, the passages through the base for the screws being elongated slightly so that the sections may be adjusted toward or from the saw guide. As is shown in Fig. 4, the forward end of each section of the rail is arranged at a slight angle so that the upper edges of the rail sections bear against the tubular saw guide at points near the top for the purposes to be explained.

The saw guide 6 is a metal tube, preferably of spring steel, and formed in two semi-circular sections 6a and 6b which are spaced apart sufficiently to provide a slot which permits the free passage of the saw. The lower end of these saw guide sections are provided with extensions or feet 9 which are welded to a ring 10 or flange, fitting in a circular socket 12 formed in the base.

The rail sections overlie the ring at their inner ends so that the saw guide is maintained in position within the socket, the under surfaces of the forward ends of the rail sections lying in close contact with the feet 9 so that the saw guide is firmly held but may be rotated to set the guide at any angle for which the adjustments are provided. The edge of the ring is provided with a series of notches 14, (five being shown) so that the guide may be set at a variety of angles. Additional notches may be provided to secure further angular adjustments. The notches are engaged by a tooth 18 on a spring keeper or latch 15 which is secured by a screw 16 fastened to the base. At the point where the screw passes through the latch, the hole may be slightly elongated so that an accurate setting of the saw guide at the exact angle required may be obtained, a slight shifting of the keeper bringing the guide to the exact angular position required.

The upper ends of each guide section are provided with two oppositely positioned wings 20, which, as shown in Fig. 1, converge at their outer ends to a point substantially of single line contact when no saw is in said guide. These wings 20 at their outer ends are provided with outwardly bent ears or lugs 21 which form the entrance to the transverse slot for the saw. As will be observed from the drawing, the wings 20 are integral with the sections 6a and 6b of the saw guide, and consequently are also formed of spring steel. The purpose of converging the wings is to cause them to bear with yielding pressure against the side of the saw and thus guide it positively and accurately. The purpose of the adjustable rail sections and their tapered inner ends, as described, is to permit the carpenter to exert adjustable pressure at points intermediate the ends of the saw-guide sections so that the pressure upon the sides of the saw exerted by the wings may be adjusted. The tapering of the ends of the rail sections is to permit the pressure to be exerted above the base of the saw guide sections to secure the desired pressure. The upper ends of the saw guide sections and the wings may be provided with the corrugations or ribs 24 for strengthening purposes.

Interiorly of the saw guide and in the tubular socket provided by the guide sections is placed the loose filler block 25, preferably of wood and provided with the slot 26 extending to a point close to its base.

It will be seen that there has been provided a superior miter box, which will give the carpenter accurate and exact adjustments. The saw guide is firmly mounted in the base and held in position by the rails. The adjustment of the rail sections gives a yielding pressure at two points upon the saw blade which will serve to guide the saw. It will be observed that the pressure upon the saw blade is exerted solely by the wings 20 at either side of the saw and that no pressure is exerted by the insert 25. This gives a greater accuracy to the movement of the saw. The accuracy of setting may be secured by the adjustment of the latch or keeper 15.

These and other advantages will be apparent from the description and drawing, it being understood that changes and modifications may be made in specific embodiments of the invention.

What is claimed is:

1. A miter box comprising a base, a slotted, tubular, spring metal saw guide adjustably mounted in said base, spring metal wings on the saw guide at either side of the slot, said wings converging to a point substantially of single line contact at their outer ends when a saw is out of said guide, the arrangement being such that when a saw is in said guide said wings will bear with yielding pressure against opposite sides of said saw at points spaced from the cutting edge.

2. A miter box comprising a base, a slotted, tubular, spring metal saw guide adjustably mounted in said base, spring metal wings on the saw guide at either side of the slot, said wings converging to a point substantially of single line contact at their outer ends when a saw is out of said guide, the arrangement being such that when a saw is in said guide said wings will bear with yielding pressure against opposite sides of said saw at points spaced from the cutting edge, and outwardly flared ears on the outer ends of said wings beyond said line of contact of said wings.

3. A miter box comprising a base, a socket in the base, a slotted tubular spring metal saw guide having a base member fitting the socket, a rail made in sections and having inner ends bearing against opposite sides of the guide, spring metal wings on the saw guide at either side of the slot, said wings converging to a point substantially of single line contact at their outer ends when a saw is out of said guide, the arrangement being such that when a saw is in said guide said wings will bear with yielding pressure against opposite sides of said saw at points spaced from the cutting edge, said rail sections being adjustable to exert graduated pressure upon the sides of the saw guide.

4. A miter box constructed in accordance with claim 3 wherein said wings are provided with outwardly flared ears on their outer ends beyond the line of contact of said wings.

JOHN A. SPERRY.